United States Patent
Vaidyanathan et al.

(10) Patent No.: US 10,282,347 B2
(45) Date of Patent: May 7, 2019

(54) ARCHITECTURE FOR CONFIGURATION OF A RECONFIGURABLE INTEGRATED CIRCUIT

(71) Applicant: Louisiana State University Research & Technology Foundation, Baton Rouge, LA (US)

(72) Inventors: Ramachandran Vaidyanathan, Baton Rouge, LA (US); Arash Ashrafi, Baton Rouge, LA (US)

(73) Assignee: Louisana State University Research & Technology Foundation, Baton Rouge, LA (US)

( * ) Notice: Subject to any disclaimer, the term of this patent is extended or adjusted under 35 U.S.C. 154(b) by 125 days.

(21) Appl. No.: 15/093,874

(22) Filed: Apr. 8, 2016

(65) Prior Publication Data
US 2016/0299872 A1 Oct. 13, 2016

Related U.S. Application Data

(60) Provisional application No. 62/144,644, filed on Apr. 8, 2015.

(51) Int. Cl.
*G06F 12/06* (2006.01)
*G06F 1/08* (2006.01)
*G06F 15/78* (2006.01)
*G06F 12/02* (2006.01)

(52) U.S. Cl.
CPC ............ *G06F 15/7871* (2013.01); *G06F 1/08* (2013.01); *G06F 12/0646* (2013.01); *G06F 15/786* (2013.01); *G06F 2212/1044* (2013.01)

(58) Field of Classification Search
CPC ............. G06F 17/5054; G06F 15/7867; G06F 12/023; G06F 12/0646; G06F 13/4291; G06F 15/786; G06F 15/7871; G06F 15/7892; G06F 1/08
USPC ........ 711/156, E12.001, 102, 103, 117, 170; 713/100
See application file for complete search history.

(56) References Cited

U.S. PATENT DOCUMENTS

| | | | |
|---|---|---|---|
| 6,948,017 B2 * | 9/2005 | Carpenter | G06F 1/08 710/105 |
| 7,478,357 B1 * | 1/2009 | Mason | G06F 17/5054 716/138 |
| 7,576,558 B1 * | 8/2009 | Lysaght | H03K 19/17732 326/16 |
| 9,097,764 B2 * | 8/2015 | Parikh | G01R 31/318541 |

(Continued)

*Primary Examiner* — Tuan V Thai
*Assistant Examiner* — Edward Waddy, Jr.
(74) *Attorney, Agent, or Firm* — Keith G. Haddaway; Venable LLP

(57) ABSTRACT

A system and method includes generating, with a configuration controller, a configuration bitstream including configuration bits to dynamically define the configuration of a reconfigurable integrated circuit by setting a state of a subset of configuration state memory units. The configuration controller accesses individual configuration state memory units of the subset according to a scan path through the configuration state memory units traversed according to a delay factor based, at least in part, on clock frequency of a clock signal produced by a configuration clock and configures the individual configuration state memory units with corresponding configuration bits of the configuration bitstream.

20 Claims, 8 Drawing Sheets

(56) References Cited

U.S. PATENT DOCUMENTS

| | | | |
|---|---|---|---|
| 9,369,984 B2* | 6/2016 | Zhu | H04W 64/003 |
| 2006/0005172 A1* | 1/2006 | Fuchs | G06F 8/427 |
| | | | 717/136 |
| 2014/0310437 A1* | 10/2014 | Saund | G06F 13/37 |
| | | | 710/118 |

* cited by examiner

US 10,282,347 B2

ARCHITECTURE FOR CONFIGURATION OF A RECONFIGURABLE INTEGRATED CIRCUIT

PRIORITY

This application claims the benefit of priority to U.S. Provisional Patent Application Ser. No. 62/144,644, filed Apr. 8, 2015, which is incorporated herein by reference in its entirety.

BACKGROUND

Reconfigurable devices, such as Field-Programmable Gate Arrays (FPGAs), have gravitated to a mainstream role in the modem computing landscape, for example, in embedded systems, network security, video processing and as accelerators in high-performance computing. Certain FPGAs allow for (dynamic) partial reconfiguration, where a portion of the FPGA can be reconfigured during run-time. FPGAs, and other reconfigurable devices, conventionally includes dedicated input/output (I/O) pins for conveying and coordinating the input of configuration bits to reconfigure the device.

BRIEF DESCRIPTION OF THE DRAWINGS

Some embodiments are illustrated by way of example and not limitation in the figures of the accompanying drawings.

DETAILED DESCRIPTION

As the number of I/O pins of is typically limited and valuable, the number of I/O pins dedicated to receiving configuration bits may be relatively limited. Thus, the time needed to partially reconfigure an FPGA may depend, in substantial part, on the number of configuration bits to be input into the FPGA. The time required to reconfigure the FPGA may be of particular relevance where partial reconfiguration is performed during a computation.

The configurable fabric of an FPGA includes a large number of configurable elements or memory cells, each holding a bit. The bit establishes a configuration state of a particular configurable element of the FPGA; the FPGA is configured by setting the states of a desired subset of a total set of configurable elements. Typically, these configurable elements are grouped together in configuration state memory units, often called frames in the art. The term "configuration state memory unit" is used here to mean a smallest collection of configurable elements that can be independently reconfigured. The bits used to configure the elements of the configuration state memory units which are selected for reconfiguration will be called the configuration bits for the configuration state memory units. In addition to these bits, the reconfiguration process uses other bits input into the FPGA, such as error correction bits and frame address bits. The configuration bitstream refers only to the configuration bits of the selected configuration state memory units; other elements such as configuration state memory unit address and error control bits can be handled separately.

A reconfiguration mechanism has been developed that loads FPGA configuration bits into a set of selected configuration state memory units. A controller utilizes a scan-path generator to generate a data path from a bitstream input that passes though the configuration state memory units that are selected to receive configuration bits and bypasses configuration state memory units that are not selected. In an example, the scan-path generator establishes the path so that only selected configuration state memory units are included in the data path and configuration state memory units that are not selected are bypassed.

It is noted that, although various principles and examples disclosed herein are described in the context of pins, those principles and examples apply to any of a variety of bandwidth-limited interfaces, including inside a chip or module. Likewise, the principles disclosed herein extend beyond FPGAs and apply to any of a variety of environments that may utilize the automatic construction of a dynamic hardware path serially connecting a subset of elements.

Figure 1:
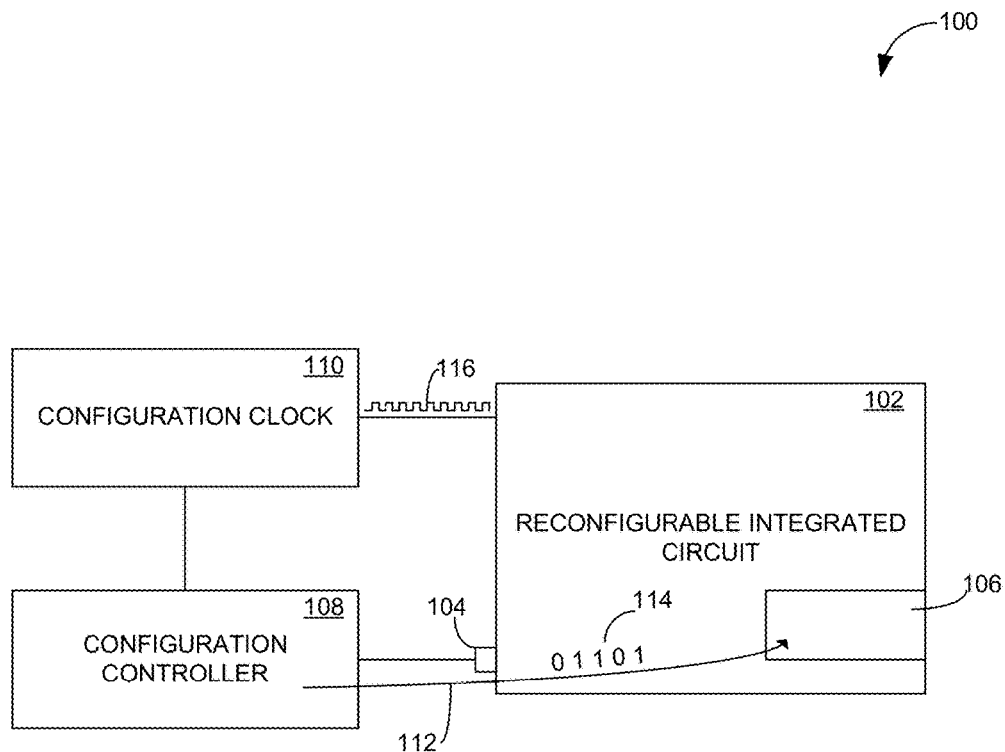
FIG. 1 is a block diagram of a system having a reconfigurable integrated circuit, in an example embodiment.

FIG. 1 is a block diagram of a system 100 having a reconfigurable integrated circuit 102, in an example embodiment. The reconfigurable integrated circuit 102 ("IC", herein) includes I/O pins 104 which provide a physical interface with other electronic components, including but not necessarily limited to electronic components of the system 100. The system 100 further includes configuration state memory units 106. In the illustrated example, the configuration state memory units 106 are native components of the IC 102. However, it is emphasized that, in various examples, the configuration state memory units 106 may be a separate component of the system 100 or may be native components of one or more other components of the system 100 and may communicate with the IC 102 and/or other components of the system 100 via I/O pins physically connected to the configuration state memory units 106 or an associated component of the system 100.

The system 100 further includes a configuration controller 108 and a configuration clock 110. The controller 108 controls the reconfiguration of the IC 102, including by dynamically reconfiguring the IC 102 by initiating the selection of configuration state memory units 106 for reconfiguration, initiating the construction of a data path connecting the selected configuration state memory units, and generating and transmitting a configuration bitstream 112 of multiple individual configuration bits 114. The configuration bits 114 are loaded into the selected configuration state memory units 106 according to the mechanisms disclosed herein.

The clock 110 provides a clock signal 116 at least to the IC 102 and, in various examples to the controller 108. In various examples, the clock 110 has a set of selectable clock frequencies, though in additional examples, the clock signal 116 has a predetermined clock frequency. The clock 110 itself may be any suitable clock known in the art, such as a crystal oscillator, a relaxation oscillator, a feedback oscillator, among other suitable components.

While the system 100 is illustrated with separate components, it is to be understood that some or all of the components of the system 100 may be implemented as a single integrated circuit. Conversely, any of the individual components of the system 100 may be incorporated as native components of the IC 102.

Figure 2:
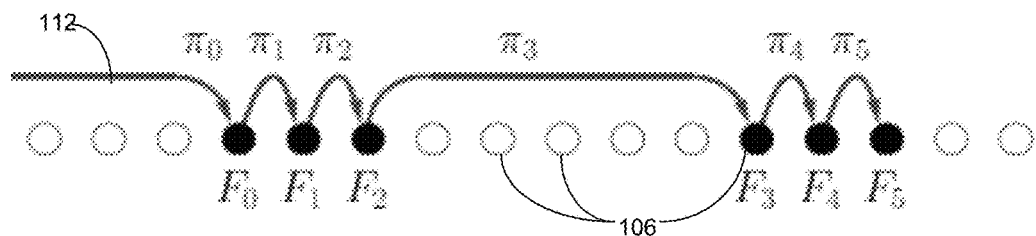
FIG. 2 is an example of configuration state memory units and bitstream, in an example embodiment.

FIG. 2 is an example of the configuration state memory units 106 and bitstream 112, in an example embodiment. In an example, C denotes the set of configuration state memory units 106 that need to be configured during a partial reconfiguration phase of the IC 102. In such an example, C is a subset of k configuration state memory units 106 from a larger set S of n configuration state memory units 106. In various examples, the k configuration state memory units 106 of C are configured by setting up a configuration path, disclosed herein, that strings its way through those configuration state memory units 106. In various examples, the configuration path includes only those configuration state memory units 106 k that require reconfiguration; the configuration bitstream 112 can then be shifted in through this path. In an example, the controller 108 may automatically select a suitable clock frequency that can be used to input these configuration bits. The clock frequency may be selected to optimize the input of the configuration bits. In various examples, and as will be disclosed and illustrated herein, if the elements of C show spatial locality, then the configuration time could be made largely independent of n.

For the purpose of partial reconfiguration, the configurable fabric of an IC 102 such as an FPGA may divided into the configuration state memory units 106, which may, in various examples, correspond to a frame in related art, and may be the smallest memory storage unit that for storing configuration bits or other configuration data that can be independently reconfigured. A configuration state memory unit 106 is reconfigured by applying a configuration bit to each of its configurable elements of the configuration state memory unit 106. Since the number of configuration bits needed (even for a single configuration state memory unit) may be much larger than the number of I/O pins 104 available to convey configuration bits in parallel, some of the configuration bits may be serially shifted in through a scan path 200 traversing the configuration state memory units 106.

An interface may map each user-defined partially reconfigurable (PR) module to a set of configuration state memory units 106. In various examples, at most one PR module may be associated with a configuration state memory unit 106; however, in further examples, a single PR module may span across multiple configuration state memory units 106. In various examples, the sizes and physical shapes of individual configuration state memory units 106 many not be well-matched to the PR module's ideal proportions; in such examples, more configuration elements of a configuration state memory unit 106 may need to be reconfigured than are directly associated with the PR module. While the use of smaller configuration state memory units 106 may, in certain circumstances, alleviate such an "unfocused" reconfiguration, doing so may result in a larger number of configuration state memory units being selected. In various circumstances, FPGAs known in the art select and reconfigure one configuration state memory unit 106 at a time; in such circumstances, using a relatively large number of small configuration state memory units 106 may introduce inefficiencies.

An MU-decoder module may allow for multiple configuration state memory units 106 to be selected simultaneously. To utilize this capability of the MU-decoder module, however, the configuration bitstream 112 may, in various examples, be directed to only those configuration state memory units 106 that need reconfiguration. In an example, if a subset of k configuration state memory units 106 (from a total of n configuration state memory units 106) need to be reconfigured, then a scan path 200 may be generated that weaves through just the k configuration state memory units 106 requiring reconfiguration. In addition, the path 200 may be generated quickly (e.g., in O(log n) time), and the path 200 may allow for relatively fast clocking of the configuration bitstream 112, e.g., by allowing the clock frequency to be relatively higher than may be the case without the scan path 200 being generated as disclosed herein. The scan path 200 may be generated automatically in hardware, given just the subset of configuration state memory units 106 to be reconfigured. Performance using the scan path 200 as disclosed herein may improve over certain other mechanisms for configuring configuration state memory units 106 known in the art, e.g., mechanism using a one-hot-decoder, which may use k iterations to select, one by one, the k configuration state memory units that require configuration.

Various mechanisms or networks are disclosed herein that generate such scan paths 200. Some or all of those mechanisms have O(n) size. In one example, a base network scans in the bitstream 112 in O(k log n) time, wherein k is the number of configuration state memory units 106 to be configured. In various examples, the number of bits in a configuration state memory unit 106 may be assumed to be independent of n and k. More complex networks (e.g., those with clock recommendations and shortcuts, as disclosed herein) may run in $O(\log n \log \log \log n + kT_0)$ time, where $T_0$ can be relatively small, depending on the physical distribution of the k configuration state memory units 106 over the n configuration state memory units 106. Such networks may produce a clock frequency recommendation (consistent with $T_0$) that the controller 108 can use. Table I below summarizes the results.

TABLE 1

| Network | Distribution | Network cost | Preprocessing time | Scan time per bit | Partial reconfiguration time (total) |
| --- | --- | --- | --- | --- | --- |
| Base network | | O(n) | O(log n) | O(log n) | O(k log n) |
| Network with clock | Random (average time) | O(n) | O(log n log log log n) | O(log n) | O(log n log log log n + k log n) |

TABLE 1-continued

| Network | Distribution | Network cost | Preprocessing time | Scan time per bit | Partial reconfiguration time (total) |
|---|---|---|---|---|---|
| recommendation | Contiguous (avg. time) | O(n) | O(log n log log log n) | O(log k) | O(log n log log log n + k log k) |
| Network with shortcut edges | Random (avg. time) | O(n) | O(log n log log log n) | O(log n) | O(log n log log log n + k log n) |
|  | Contiguous | O(n) | O(log n log log log n) | O(1) | O(log n log log log n + k) |

For the network with clock recommendation and the network with shortcut edges, as disclosed in detail herein, scan times may be lower, and in various circumstances substantially lower, than $\Theta(\log n)$. The clock recommendation may determine a clock frequency that can be used, such as an optional or optimized clock speed. In some examples, log n<<k<<n. Therefore, the preprocessing times shown in Table I or the O(log n) delay of the MU-Decoder may not be significant overheads to the reconfiguration time.

In an example, $S=\{0, 1, \ldots, n-1\}$ is set of configuration state memory units 106 and $C \subseteq S$ is a k-configuration state memory unit 106 subset for partial reconfiguration. In an example, for simplicity and without loss of generality, each configuration state memory unit 106 requires one (1) configuration bit. (To accommodate $b=p \cdot s>1$ configuration bits per configuration state memory unit 106 of C, p parallel scan paths 200 and a local serial scan path 200 of length s may be used for each configuration state memory unit 106.) A circuit may connect the configuration state memory unit 106 of C in a serial scan path 200 in which configuration state memory unit 106 of C represent flip-flops and hardware between flip-flops is combinational, as illustrated in FIG. 2 In an example, the circuit connects only the configuration state memory units 106 of C in a serial scan path 200. In the example, the circuit has k flip-flop configuration state memory units 106 (denoted $F_0, F_1, \ldots F_{k-1}$) connected serially with $\pi_i$ as the combinational path 200 from $F_{i-1}$ (if it exists) to $F_i$; 0<k. In an example, $t_i$ denotes the delay of path 200 $\pi_i$. Then ignoring flip-flop set-up/hold times and safety margins, the minimum time between two clock pulses for this circuit is $T_0=\max\{t_0, t_1, \ldots, t_{k-1}\}$ and the maximum clock frequency is:

$$f = \frac{1}{T_0}$$

On such a circuit, k bits can be scanned into configuration state memory units 106 in $kT_0$ time. In such an example $T_0$, is the delay of the scan path 200. The sets S and C are the scan set and the configuration set, respectively. It is assumed for $|S|=n$ and $|C|=k$, where $n \geq k$.

In an example, system 100, when given set $C \subseteq S$, configures itself to form a scan path 200 with small delay that traverses the configuration state memory units 106 of C. In an example, the system forms a scan path 200 with a small delay that traverses only the configuration state memory units 106 of C.

Figure 3:
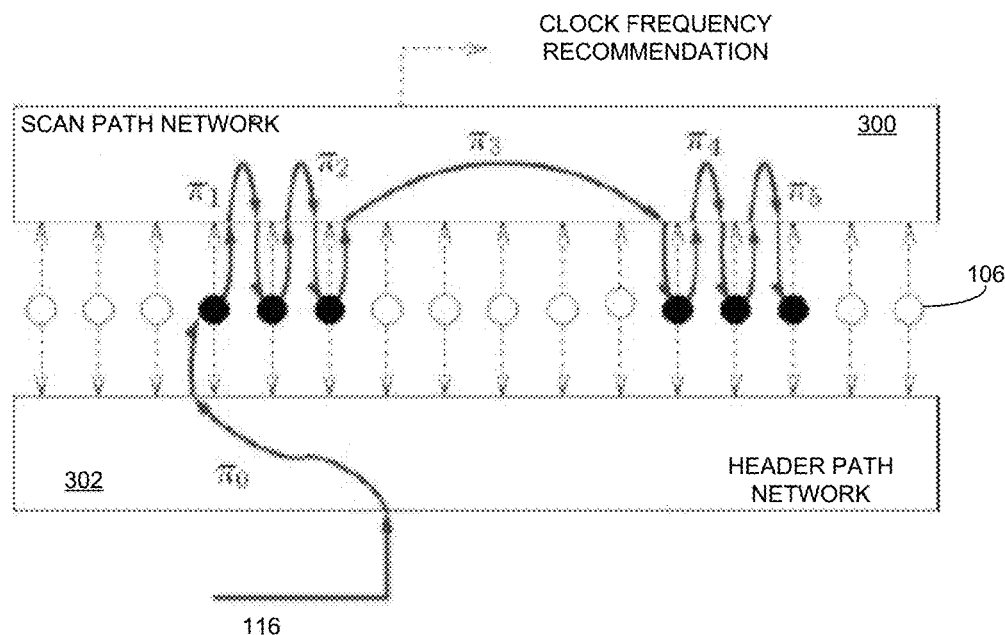
FIG. 3 is an abstraction of an overall structure of configuration state memory units, in an example embodiment.

FIG. 3 is an illustration of an overall structure of the configuration state memory units 106, in an example embodiment. The scan path network 300 establishes the combinational paths:

$$\pi_1, \pi_2, \ldots, \pi_{k-1}$$

In fact it can also establish $\pi_0$. However, in certain examples, $t_0=O(\log n)$ so as to cause a delay of the entire scan path 200 of at least O(log n). If this delay is acceptable, then the header path network 302 may, optionally, be omitted. Otherwise, the header path network 302 establishes a fast path $\pi_0$ to the first element of C. In some examples, establishing a fast path $\pi_0$ to the first configuration state memory units 106 of C opens up the possibility of speeding up the configuration bitstream clock relative to slower paths $\pi_i$ for i>0.

Each of the scan path network 300 and header path network 302 may have two "planes," a data plane and a control plane. In an example, the data plane is illustrated in FIG. 3. The data plane may be combinational, in an example entirely combinatorial, and have one or more paths 200 connecting the flip-flops corresponding to configuration state memory units 106 of C, through which the configuration bitstream 112 is to be scanned in. In an example, the control plane may primarily generate signals to set up the path(s) 200 in the data plane. The control plane of the scan path network 300 may, optionally, also generate a clock frequency recommendation based on the path lengths in the data plane. The control plane may contain sequential elements, but, in various examples, the configuration bitstream 112 does not necessarily traverse the control plane and, in certain examples, does not traverse the control plane.

The networks may configure header path $\pi_0$, configure the scan path $\pi_1, \pi_2, \ldots, \pi_{k-1}$, and generate a clock frequency recommendation. In various examples, the bitstream 112 can be scanned in when some or all of these actions are completed. While the header and scan paths can be established in parallel, the clock frequency recommendation may not be generated until the scan path has been established. In an example, if the three tasks above utilize $t_h$, $t_s$, $t_c$ time respectively (for header, scan and clock), then the minimum time before the bitstream 112 can be scanned in is $\max\{t_h, t_s+t_c\}$. If the clock frequency recommendation is to have clock cycle of duration $T_0$ then the total time needed for partial reconfiguration is $$\max\{t_h, t_s+t_c\}+kT_0.$$

Here, $\max\{t_h, t_s+t_c\}$ is the preprocessing time (to set up the scan path) and $kT_0$ is the time to scan in the k bits.

Figure 4:
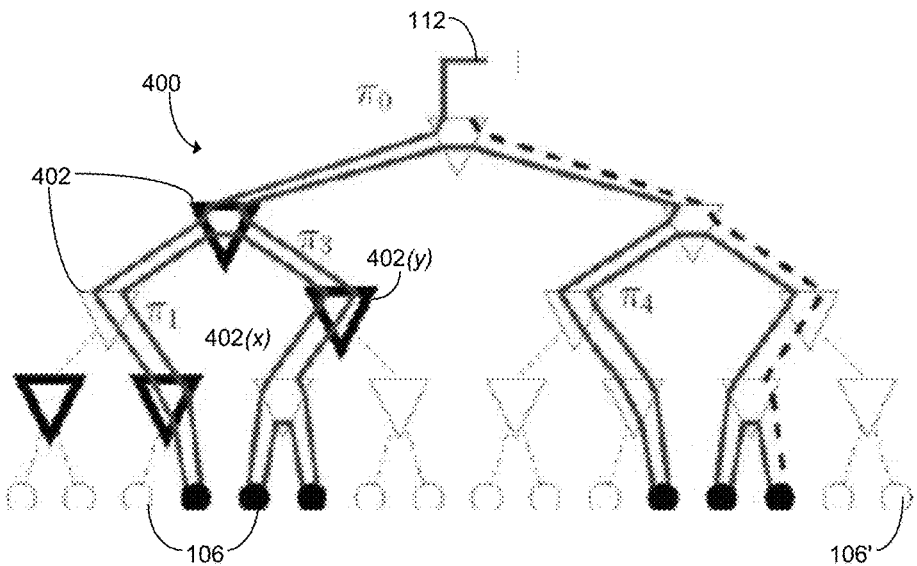
FIG. 4 is a hierarchical structure for a scan path network, in an example embodiment.

FIG. 4 is a hierarchical structure 400 for a scan path network, in an example embodiment. In an example, each node 402(x), hereinafter "x", in an underlying tree has three pairs of ports, $p_i(x), p_o(x), l_i(x), l_o(x), r_i(x), r_o(x)$ (see FIG. 5); as illustrated one pair connects to the parent of x, and the remaining pairs connect to the two children of x. In such an example, x is the left child node 402(y), hereinafter "y"; that is, y is the parent of node x. Then port $p_i(x)$, that represents the input line from the parent y of x connects from $l_o(y)$ to line to the left child of y. Similarly $p_o(x)$ connects to $l_i(y)$ and ports $l_i(x), l_o(x), r_i(x), r_o(x)$ to the left and right children of x. By internally connecting input ports to output ports within each node, a path can be established within the tree (much like buses are constructed on a reconfigurable mesh). In the illustrated example, the root internally connects $p_i$ to $l_o$ for path $\pi_0$. While a binary tree is presented and described for the purposes of illustration, it is to be understood that the principles disclosed may readily be applied to higher-degree trees with degree d>2. Higher-degree trees may result in reduced reconfiguration time in comparison with lower-degree trees.

Figure 5:
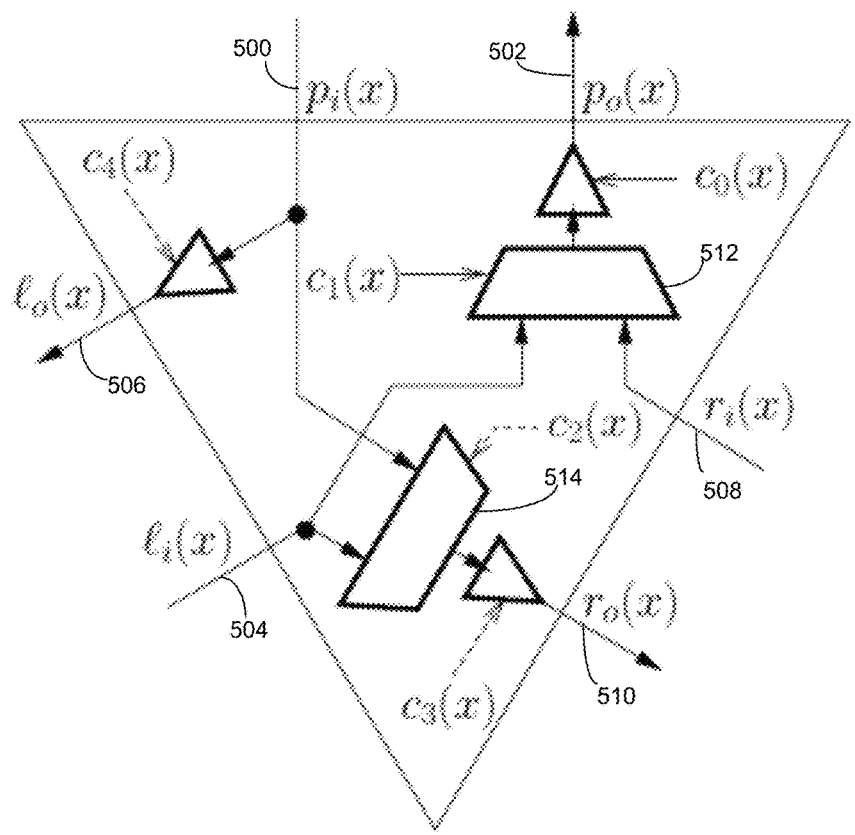
FIG. 5 illustrates the internal structure of the data plane of a node, in an example embodiment.

FIG. 5 illustrates the internal structure of the data plane of a node 402, in an example embodiment. The node 402 has an parent input port 500, a parent output port 502, a left side input port 504, a left side output port 506, a right side input port 508, and a right side output port 510. For the parent output port 502 and the right side output port 510, a multiplexer 512, 514 selects at most one of the two inputs from the other two sides of the node 402. Thus, the multiplexer 512 is coupled to the left and right side input ports 504, 508 while the multiplexer 514 is coupled to the parent input port 500 and the left side input port 504. The multiplexers 512, 514 may include the possibility of selecting neither associated input port (for example through a tristate gate). The left side output port 506 $l_o(y)$ can be optionally connected to the parent input port 500 $p_i(x)$. By appropriately setting the control lines $c_0(x), c_1(x), \ldots c_4(x)$ the four internal connections shown in Table II can be realized, as illustrated as the bold nodes 402 in FIG. 4. The path in FIG. 4 may be generated by setting the control lines of each of the bold nodes 402 of FIG. 4.

TABLE II

CONTROL PLANE OPERATION

| global condition | local condition | | | internal configuration |
|---|---|---|---|---|
| | $\alpha_x$ | $\beta_x$ | $\gamma_x$ | |
| $T_x$ is not active | 0 | 0 | 0 | |
| $T_x^l$ is not active, but $T_x^r$ is | 0 | 1 | 1 | |
| $T_x^r$ is not active, but $T_x^l$ is | 1 | 0 | 1 | |
| Both $T_x^l$ and $T_x^r$ are active | 1 | 1 | 1 | |

As further illustrated in FIG. 4, the control plane of the scan path network also has an underlying tree. At the leaves are the n configuration state memory units 106 of the scan set S. The k configuration state memory units 106 of the configuration set C are distinguished by a flag $f_i$ that is 1 if and only if $i \in C$. If none of the leaves of x are in C, then none of the ports 500 et seq. of x are internally connected. Three other internal configurations can also be similarly categorized as shown in Table II. For brevity, $T_x, T_x^l, T_x^r$ denote the subtrees rooted at x, its left child and its right child, respectively. The leaves of the tree are configuration state memory unit 106 of S. In various examples, tree T is active if and only if there is a leaf i, i.e., a configuration state memory unit 106, in T such that $i \in C$. The global conditions that characterize the internal configurations of a node 402 can be reduced to simple local conditions by propagating "indicator bits," described in detail below. Each leaf i sends its flag f as the indicator bit to its parent node 402. As detailed herein, in an example, $f_i=1$ if and only if $i \in C$. In an example, each control node x receives indicator bits $\alpha_x$ and $\beta_x$ from its left and right children. Then the control node x uses the internal configuration shown in Table II and sends indicator bit $\gamma_x=(\alpha_x$ or $\beta_x)$ to its parent node 402. The local conditions of Table II reflect the global condition. The values of control signals $c_0(x), c_1(x), \ldots, c_4(x)$ of FIG. 5 can be derived from the internal configurations of Table II.

In an example, each node 402 of the control and data planes uses a constant amount of logic, so its cost and delay are both constants independent of both n and k. Since the number of internal, non-leaf nodes 402 in the network is n−1, the hardware cost of the scan-path network is $\Theta(n)$. In various examples, the control plane may determine the control inputs with $O(\log n)$ combinational delay and latch these values for configuring and maintaining the scan path in the data plane. This scan path also generates a path out of the last configuration state memory unit 106 of C (FIG. 4, configuration state memory unit 106'), but as observed earlier, may not necessarily be of consequence to the speed of operation of the scan-path.

In an example, the header path $\pi_0$ of the scan path has $\Theta(\log n)$ delay. Other paths $\pi_j$ (for 0<j<k) may have $O(\log n)$ delay in the worst case, but can be substantially shorter (for example, paths $\pi_2, \pi_5$). Path lengths are described in detail below. Therefore, the following results may be generated:

In an example, for any $1 \leq k \leq n$, the scan set S and the configuration set C have n and k elements respectively. There exists a scan-path network that can generate a scan-path through the configuration state memory units 106 of C such that its hardware cost is $\Theta(n)$, its delay is $\Theta(\log n)$ and the scan-path clock cycle time is $\Theta(\log n)$. This result is without the header-path network and clock frequency recommendation.

In an example, there exists a scan-path network of size $\Theta(n)$ that can configure any set of k elements out of a set of n elements in $\Theta(k \log n)$ time. In the network described herein, the header-path $\pi_0$ may have a delay $\Theta(\log n)$; consequently, the delay of the scan-path may not necessarily be improved, even if other paths have a smaller delay. In various examples, the delay of path $\pi_0$ may be reduced according to mechanisms disclosed herein. In such examples, the delay may be reduced by determining the first configuration state memory unit 106 of C, which may be identified as a "header leaf", and then using a fast network to broadcast the configuration bitstream 112 to all leaves, i.e., configuration state memory units 106, with the understanding that only the header leaf will accept the configuration bitstream 112.

Figure 6:
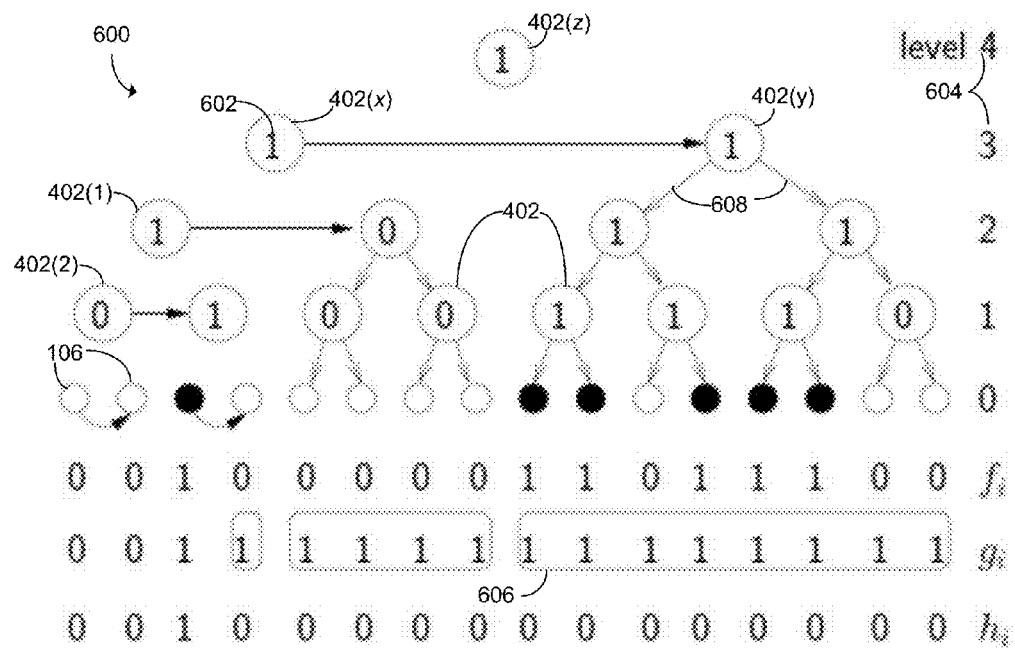
FIG. 6 illustrates an example tree illustrative of prefix OR of n bits, in an example embodiment.

FIG. 6 illustrates an example tree 600 illustrative of prefix OR of n bits, in an example embodiment. To determine the header leaf, $\vec{F}=(f_i:0\le i<n)$, where $f_i=1$ if and only if $i\in C$ and $\vec{F}$ is the characteristic vector representing the configuration subset $C\subseteq S$. In an example, $\vec{G}=(g_i: 0\le i<n)$ is the prefix OR vector of $\vec{F}$, where $g_0=f_0$ and for $i>0$, $g_i=(f_i$ OR $g_{i-1})$. If $i_0$ is the header leaf, then $g_i=1$ if and only if $i_0\le k$. In an example, $h_0=g_0$ and for $i>0$, $h_i=(g_i$ EX-OR $g_{i-1})$. Thus, $h_i=1$ if and only if $i=i_0$. Given G, $h_i$ can be determined with n−1 EX-OR gates and one EX-OR gate delay. What remains is determining $\vec{G}$, given $\vec{F}$.

The computation proceeds in two phases on the tree 600. In the first phase, a configuration state memory unit 106 i assumes the value $f_i$ and each internal node 402 x holds the logical OR $\gamma_x$ of the values of all configuration state memory units 106 in its subtree. The bits 602 within circles in show these values in an example. In the illustrated example, the computation is the same or substantially the same as that used to establish the scan path (see Table II).

The second phase proceeds from the root node 402(z), hereinafter "z" down to the configuration state memory units 106 in log n steps, one step per level 604 starting from the children of the root 402(1) (level log n−1). In an example, the nodes 402(x) and 402(y) are the left and right child, respectively of the root, hereinafter x and y, respectively. In the first step of the second phase, x sends $\gamma_x$ to y. If $\gamma_x=1$, then y instructs all configuration state memory units 106 i of its subtree to set $g_i=1$; otherwise, nodes at level log n−2 or lower proceed recursively as described below. In an example, a node x at level log n−t (where $1<t\le\log n$) is the left child of its parent z. In such an example, y is the right child of z (that is, the sibling of x). If z has not instructed its leaves to set $g_i=1$, then at step t, nodes x and y proceed recursively as described herein; namely, node x sends $\gamma_x$ to y, than if $\gamma_x=1$, then y instructs its leaves to set $g_i=1$; otherwise level t+1 proceeds recursively. The value generated at the configuration state memory units 106 after any sibling communication is $g_i$. The recursion terminates at the configuration state memory units 106.

FIG. 6 illustrates the second phase. In an example, in level 3, the left child x of the root z sends a 1 to the right child y, which instructs all its configuration state memory units 106 to set $g_i=1$, denoted by box 606. The setting of the configuration state memory units 106 of y is indicated in the figure as tree edges 608, as opposed to an edge from a left child to its sibling. For level 2, the leftmost node 402(1) similarly sends a 1 to its sibling which too causes all its leaves to set $g_i=1$. At level 1, the leftmost node 402(2) sends a 0 to its sibling, and both their descendants proceed recursively. For the first pair of leaves $\gamma_0=\gamma_1=0$; leaf node 0 sets $g0=\gamma_0=0$ and sends a $\gamma_0=0$ to leaf node 1, which sets $g1=\gamma_1=0$. The second pair of leaves have $\gamma_2=1$ and $\gamma_3=0$. Here leaf node 2 sets $g_2=\gamma_2=1$ and sends $\gamma_2=1$ to leaf node 3. Because the received bit $\gamma_2=1$, leaf node 3 sets $g_1=1$ (even though $\gamma_3=0$). While Phase 2 is cast recursively, it can be unfolded into a circuit with $\Theta(\log n)$ delay and $\Theta(n)$ gates.

Once the header configuration state memory unit 106 i, indicated by flag $h_i=1$, has been determined, the bitstream 112 can be broadcast to some or all configuration state memory units 106 with the understanding that header configuration state memory unit 106 i will act on the bitstream 112 if and only if $h_i=1$. In some examples, at the end of Phase 1, each tree node x holds $\gamma_x$, the OR of the bits at the configuration state memory units 106 of the subtree rooted at x. As illustrated, such values are shown within the circles representing the various nodes 402. As shown in Table II, the node x receives $\alpha_x$ and $\beta_x$ from its left and right child and determines $\gamma_x=\alpha_x$ OR $\beta_x$. Phase 2 proceeds from the root down to the configuration state memory units 106 and x receives an input $\delta_x$ from the parent of x; in addition, it has input $\alpha_x$ received during Phase 1. Node x produces outputs $\xi_x^l$, $\xi_x^r$, to its left and right child, respectively. In this notation, if the left and right child of x are u and v, respectively, then $\xi_c^l=\delta_u$ and $\xi_x^r=\delta_v$. For the root, in an example, it may be assumed that $\delta_{root}=0$. The outputs of x may be assigned as follows: $\xi_c^l=\delta_x$; $\xi_x^r=\alpha_x$ OR $\delta_x$. In an example, configuration state memory unit 106 i receives input $v_i$ from its parent j; here $v_i=\xi_j^l$ or $\xi_j^r$. Finally, configuration state memory unit 106 i computes $g_i=$fi OR $v_i$.

Figure 7:
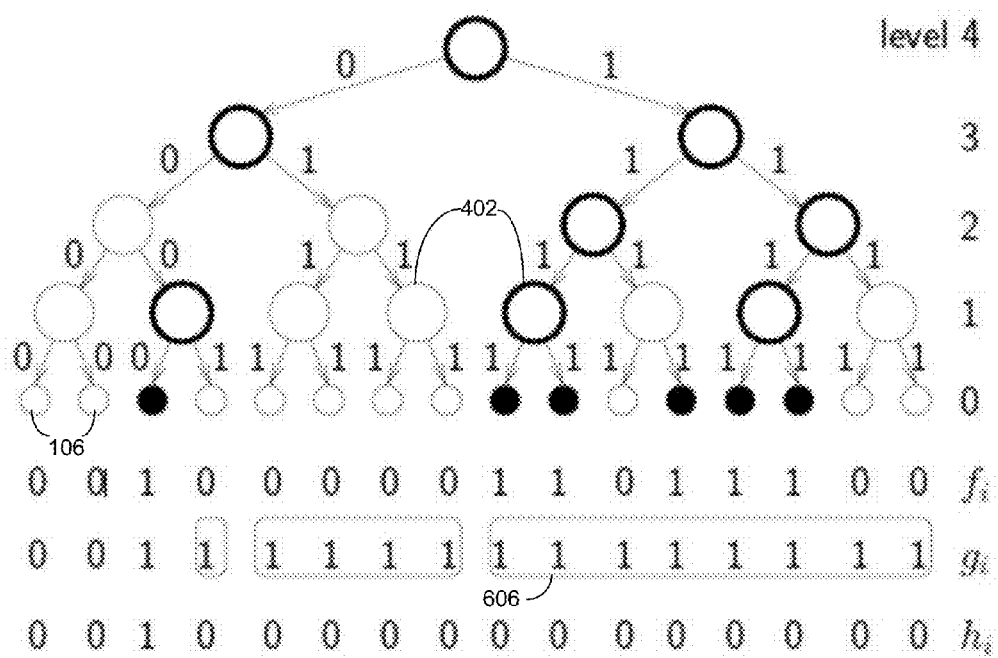
FIG. 7 is a non-recursive implementation of a prefix OR tree, in an example embodiment.

FIG. 7 is a non-recursive implementation of the prefix OR tree 600, in an example embodiment. In various examples, after the header configuration state memory unit 106 is determined, a broadcast network can direct the path $\pi_0$ to all leaves with the understanding that only the header configuration state memory unit 106 will read the bits traversing $\pi_0$.

In various examples, such a broadcast network would not necessarily be more complex than the clock distribution network used to clock a chain of shift registers spanning the scan path. Thus, where the header configuration state memory unit 106 can be determined, then the header path $\pi_0$ can be constructed to have a constant or virtually constant delay. Consequently, the delay of the scan path may be independent of $\pi_0$.

Figure 8:
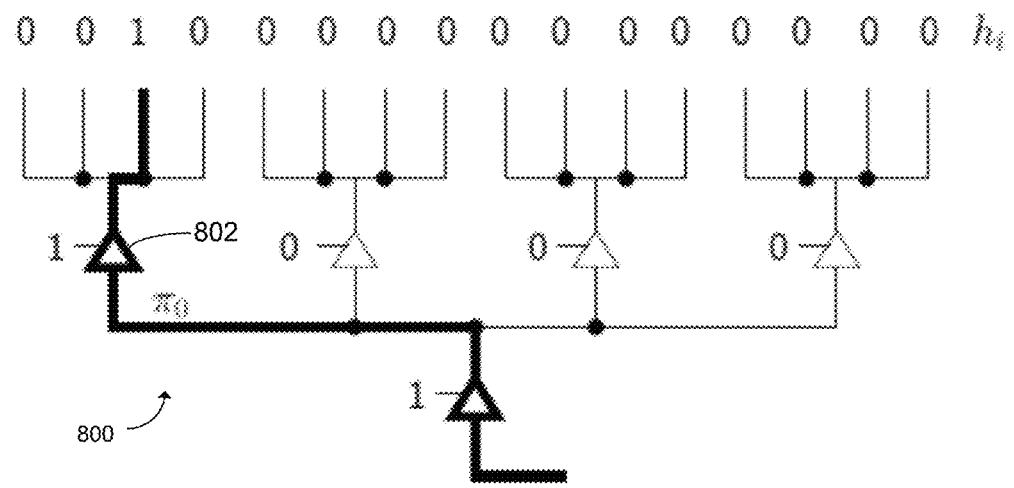
FIG. 8 illustrates a broadcast network, in an example embodiment.

FIG. 8 illustrates a broadcast network 800, in an example embodiment. The broadcast network 800 corresponds to the tree 600 but operates with comparatively lower power, in an example embodiment. As illustrated, all parts of the broadcast network 800, except a path $\pi_0$, are disabled. The control signals needed for this can be generated alongside the generation of $h_i$, as illustrated in FIGS. 6 and 7. The broadcast network 800 may utilize tristate gates 802 with fan-out to four outputs, in an example embodiment. In practice, a non-broadcasting network can support a fan-out that larger than that of a clock distribution or broadcast network 800 and can, in various examples, be assumed to be of constant delay.

In various examples, for any set of k configuration state memory units 106 selected out of n configuration state memory units 106, there exists a header-path network that determines a constant delay path to the first of the selected configuration state memory units 106. The broadcast network 800 as illustrated uses $\Theta(n)$ gates and has a delay of $\Theta(\log n)$.

As disclosed above, the maximum clock frequency for scanning in the bitstream 112 is independent of the header path, $\pi_0$, depending on the delays of the remaining paths $\pi_1$, $\pi_2, \ldots, \pi_{k-1}$. As disclosed herein, some of these paths may be relatively short (length 2) and others relatively long (length 2 log n); in fact, any path between adjacent nodes of C that are in separate halves of the tree may result in a path of length 2 log n. In an example, the maximum clock frequency is inversely proportional to the length of the longest path which is equal or proportional to a resultant delay factor that may be introduced, as disclosed herein.

In an example, there are $$\binom{n}{k}$$

ways to select a k-element configuration set C from an n-element scan set S. In an example, it may be assumed that all these ways are possible with equal probability $$1 / \binom{n}{k};$$

that is, the elements of the configurable set C are randomly distributed over the scan set S. For any specific choice of C, the scan-path delay can range from 2 to 2 log n; for simplicity, and without loss of generality, the delay of each node 402 may be 1. In an example, for any given 2≤k≤n, the average maximum path length is A(n, k). If a particular configurable set C includes elements from both halves of scan set S, then the scan-path delay is 2 log n (as this path traverses the root of the tree). In an example, $\alpha_{n,k}$ is the probability that C spans both halves of S. Then $$A(n, k) = \sigma_{n,k}(2\log n) + (1 - \sigma_{n,k}) \cdot A\left(\frac{n}{2}, k\right) \quad (2)$$

If $$k > \frac{n}{2},$$

then $\sigma_{n,k}=1$ and A(n,k)=2 log n. In an example, $$k \leq \frac{n}{2}.$$

The probability that C is restricted to one of the halves of S is $$2\binom{n/2}{k} / \binom{n}{k} = 2\prod_{j=0}^{k-1}\left(\frac{n-2j}{2n-2j}\right) \leq \frac{1}{2^{k-1}};$$

the last inequality follows from the fact that for any x≤2y≤0, $$\frac{x-2y}{2x-2y} \leq \frac{1}{2}.$$

That is, $$\sigma_{n,k} \geq \left(1 - \frac{1}{2^{k-1}}\right) \geq \frac{1}{2}$$

From this and Equation (2) it can be determined that A(n, k)≥$\sigma_{n,k}$ (2 log n)≥log n. Since the worst case delay is 2 log n, the average scan-path delay for a random distribution of configuration state memory units 106 over an n-element scan set is Θ(log n).

In various examples, the configuration state memory units 106 are placed close to each other. For example, if a partial reconfiguration module spans multiple configuration state memory units 106, then these configuration state memory units 106 would be contiguous. In one example, all k configuration state memory units 106 of C are contiguous elements of S. In such a case, there are only n−k+1 possibilities with only k−1 of these spanning both halves of S. Therefore for $$k \leq \frac{n}{2}$$

and with α=k−1, $$\sigma_{n,k} = \frac{k-1}{n-k+1} = \frac{\alpha}{n-\alpha}$$

and $$1 - \sigma_{n,k} = \frac{n-2\alpha}{n-\alpha}.$$

From this and Equation (2), $$A(n, k) = 2\log n\left(\frac{\alpha}{n-\alpha}\right) + \left(\frac{n-2\alpha}{n-\alpha}\right) \cdot A\left(\frac{n}{2}, k\right) \quad (3)$$

Let $$2^u \leq \frac{n}{k} < 2^{u+1}.$$

Then $$A\left(\frac{n}{2^{u+1}}, k\right) \leq 2\log k.$$

Equation (3) can be expanded to the following for n≥4.

$$A(n, k) \leq 2\log k + \sum_{j=0}^{u}\left(\frac{2^j \alpha}{n-\alpha}\right)[(\log n) - j] \leq$$

$$2\log k + \left(\frac{\alpha}{n-\alpha}\right)[2^{u+1}(\log n - u + 1)]$$

For √n≥k≥1, it is the case that $$\frac{\alpha}{n-\alpha} = \frac{k-1}{n-k+1} \leq \frac{k}{n}.$$

Since $$u + 1 > \log\left(\frac{n}{k}\right) \geq u,$$

it is determined that $$\left(\frac{\alpha}{n-\alpha}\right)[2^{u+1}(\log n - u + 1)] \leq 2 + 2\log k.$$

Thus $$A(n,k) \geq 2 + 4 \log k$$

The above is applicable where $k \leq \sqrt{n}$. If $k > \sqrt{n}$, then $A(k, n) \leq 2 \log n \leq 4 \log k$. Thus, in an example, the average scan-path delay for a contiguous distribution of k configuration state memory units 106 over an n-element scan set S is O(log k).

Certain above examples illustrate extreme cases for the distribution of the configuration state memory units 106. Various examples would lie in between, including closer to the contiguous distribution case described above. Therefore, in various examples, a relatively fast clock could be used for many cases. In an example, the clock may be configured to know the acceptable clock speed/frequency for the scan-path or be controlled or otherwise adjusted to produce the acceptable clock speed. The system disclosed herein can be used to select an appropriate clock frequency for scanning in the configuration bitstream 112.

As described herein, in various examples the scan path consists of k flip-flops with combinational paths $\pi_0, \pi_1, \ldots, \pi_{k-1}$ to their inputs. In an example, $t_i$ denotes the delay of path $\pi_i$. As detailed above, $t_0$ can be assumed to be 1. Therefore, the scan-path delay is $t_s = \max\{t_i: 1 \leq i < k\}$. If the highest level 604 that path $\pi_i$ reaches is $l_{max}$, then its delay is $2l_{max}$. Thus, by detecting a node x where the path turns from the left child to the right child, the level of x can be ascertained and, hence, the maximum admissible clock frequency. Additionally, even though the level 604 can be as large as log n (a log log n-bit quantity), each node 204 may, in various examples, be of constant size so that the entire network 800 can be of size $\Theta(n)$.

In an example, each node x sets a flag $\rho_x$ to 1 if and only if the path turns from its left child to its right child by $\sigma_x = (\alpha_x$ and $\beta_x)$ (see Table II). Such nodes 402 may be referred to herein as "turn nodes". The dummy path $\pi_k$ may be omitted or ignored.

At clock cycle $t \geq 0$, each node x with children y and z generates a bit $\xi_x^t$ as follows:

$$\xi_x^0 = \rho_x \text{ and for } t > 0, \xi_x^t = (\xi_x^{t-1} \text{ or } \xi_y^{t-1} \text{ or } \xi_z^{t-1})$$

For a node x, D(x) is the set of descendants of x (including x itself). Here $B(x) = \{y \in D(x): \rho_y = 1\}$ is the subset of descendants of x that are turn nodes. For any node x, level(x) is the level of node x. The turning level 608, $L(x) = \max \{level(y): y \in B(x)\}$, of node x be the level of the highest turning descendant of x. Thus, for any node x with turning level $L(x)$, bit $\xi_x^t = 1$ if and only if $t \geq level(x) - L(x)$.

For the root r of the tree, $L(r) = l_{max}$ is the level reached by the highest delay path. The sequence of bits produced by the root over log n steps is $$C = \underbrace{0, 0, \ldots, 0}_{\log n - l_{max} \text{ zeroes}} \underbrace{1, 1, \ldots, 1.}_{l_{max} \text{ ones}}$$

In various examples, C is a unary representation of $l_{max}$. A separate O(log n)-state finite state machine (FSM) can accept a log n-bit sequential input C from the root and convert the sequential input C to the corresponding log log n-bit binary number; this FSM may be understood to be a special purpose O(log log n)-bit counter. The log log n-bit output is a measure of the delay of the scan-path and may be used to derive the maximum clock rate for scanning in the configuration bitstream 112. The log log n-bit counter can be built with a clock cycle proportional to log log log n. The cost of the FSM is O(n). Thus, for any n, there exists a O(log n log log log n)-delay, O(n) cost network that outputs the scan-path delay for any configurable set of an n-element scan set.

Further, in various examples, there exists a scan-path network of size $\Theta(n)$ that can configure any set of k configuration state memory units 106 out of a set of n configuration state memory units 106 in $\Theta(\log n \log \log \log n + kT_0)$ time, where $T_0$ is the minimum clock cycle needed for the scan-path network. For a contiguous distribution of the k configuration state memory units 106 of the configuration set S, this network may use an average value of $T_0 = O(\log k)$.

Figure 9:
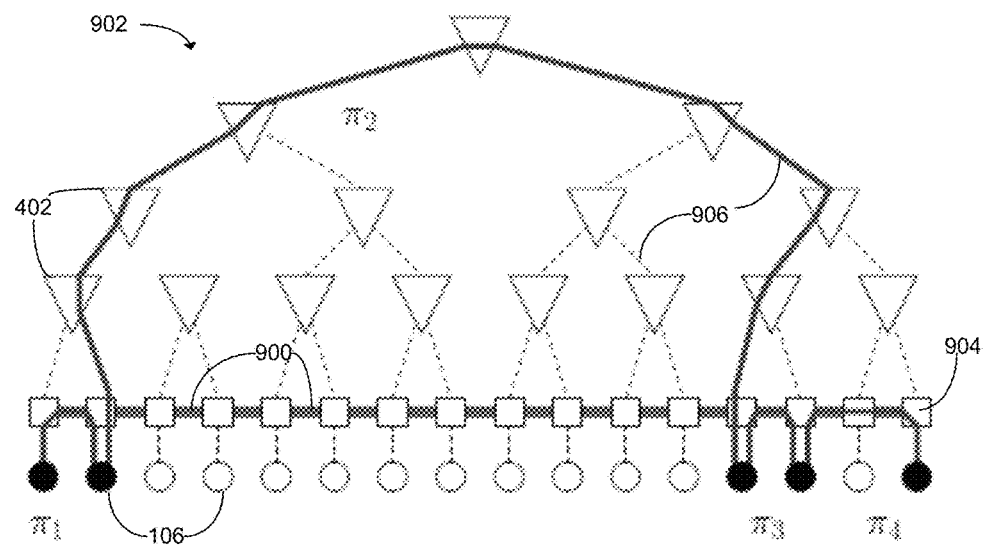
FIG. 9 illustrates the addition of a shortcut edge between adjacent configuration state memory units of a data tree, in an example embodiment.

FIG. 9 illustrates the addition of a shortcut edge 900 between topologically proximate configuration state memory units 106 of a tree 902, in contrast with configuration state memory units 106 which may be logically adjacent or proximate to one another, in an example embodiment. Put another way, proximity or adjacency may be determined on the basis of physical proximity or adjacency rather than logical adjacency. As used herein with respect to configuration state memory units 106, adjacent should be understood to include configuration state memory units 106 which are topologically proximate to one another. The shortcut edge 900 represents a direct physical electrical connection between adjacent configuration state memory units 106. The direct physical electrical connection may be a conductor within the IC 102 between the adjacent configuration state memory units 106 or between switches, as disclosed herein, associated with the configuration state memory units 106 that does not pass through another component of the IC 102 and which connects the configuration state memory units 106 according to a relatively short physical path.

The trees utilized thus far are underlying balanced binary trees for various aspects of the architecture. The delay paths in such a tree are log n-delay paths when two adjacent configuration state memory units 106 of C lie on different halves of S, even if the indices differ by a small amount (for example, if $$\frac{n}{2} - 1, \frac{n}{2}$$

$\in C$, then the topological distance between them would be 2 log n). In various examples, the tree may be augmented by adding an edge 900 between adjacent switches 904 associated with individual configuration state memory units 106. In some examples, the switches 904 determine whether a path is going to go up the tree 902 on a tree edge 906 or directly move to the next configuration state memory unit 106 using the edge 900 shortcut. This would, for example, reduce the distance between $$\frac{n}{2} - 1$$

and

-continued $$\frac{n}{2}$$

to 1. r or the case where C has contiguous configuration state memory units 106 of S, the scan path delay is a constant. However, for other pairs of configuration state memory units 106, for example $$\frac{n}{3}$$

and $$\frac{n}{2},$$

the path in the original tree may provide better performance.

Figure 10:
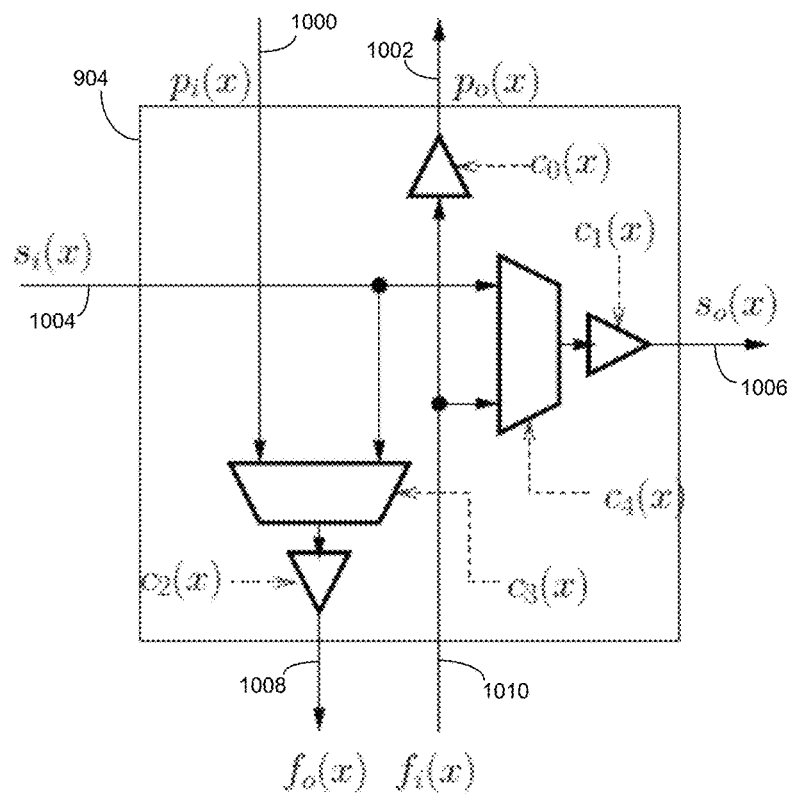
FIG. 10 illustrates a structure of a switch, in an example embodiment.

FIG. 10 illustrates a structure of the switch 904, in an example embodiment. As illustrated, each switch 904 is a separate and independent component individually associated with exactly one other configuration state memory unit 106. A configuration state memory unit 106 and associated switch 904 combination may alternatively either be included in the same identifiable component, such as a combination configuration state memory unit 106 and switch 904, or may be logically considered to be the same component. Thus, in various examples, references to a configuration state memory unit 106 or element may refer to the combination of the configuration state memory unit 106 and associated switch 904. However, it is noted and emphasized that examples disclosed herein which do not affirmatively disclose a switch 904 may or may not include a switch 904, as appropriate to the implementation circumstances of example. In the illustrated example, the switch 904 includes parent input port 1000, parent output port 1002, side input port 1004, side output port 1006, configuration state memory unit output port 1008, and configuration state memory unit input port 1010. In various examples, additional symmetric logic can connect a first configuration state memory unit 106 to both adjacent configuration state memory units 106 and that, notwithstanding examples which illustrate a left-to-right passage through the switch 904, right-to-left passage is also implementable.

Figures 11A, 11B, 11C, 11D:
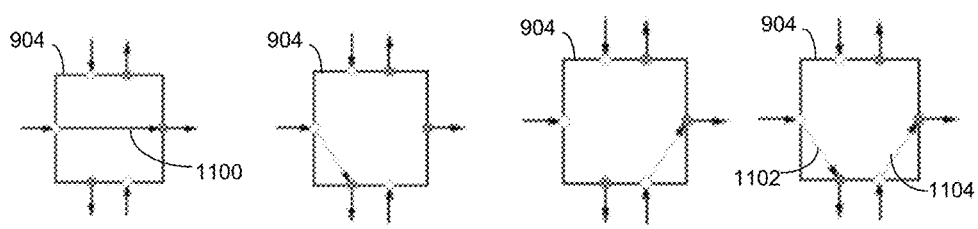
FIGS. 11A-11H show eight configurations of switches that may be utilized in some examples.
Figures 11E, 11F, 11G, 11H:
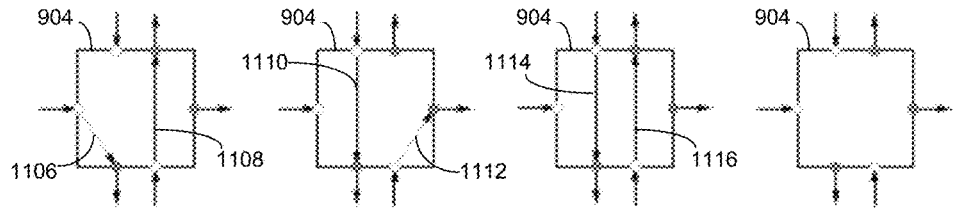

FIGS. 11A-11H show eight configurations of switches 904 that may be utilized in some examples. These configurations are not limiting and the switch 904 may be configured into any configuration consistent with the architecture of the switch 904. Various such configurations are illustrated in the example of FIG. 9. FIG. 11A illustrates a shortcut path 1100 passing through the switch 904 between neighboring switches 904. FIG. 11B illustrates access for a last configuration state memory unit 106 of a set S. FIG. 11C illustrates access for a first configuration state memory unit 106 of the set S. FIG. 11D illustrates access for the end of a first shortcut path 1102 and a beginning of a second shortcut path 1104. FIG. 11E illustrates the end of a shortcut path 1106 and a beginning of a tree path 1108. FIG. 11F illustrates the end of a tree path 1110 and a beginning of a shortcut path 1112. FIG. 11G illustrates and end of a tree path 1114 and a beginning of a tree path 1116. FIG. 11H illustrates no path. In addition to the illustrated configurations, other configurations of the switch 904 are contemplated and possible based on the design of the switch 904 as illustrated or based on alternative implementations of the switch 904. Such additional configurations may be based, for instance, on the specific implementation of the header path network 302.

Figure 12:
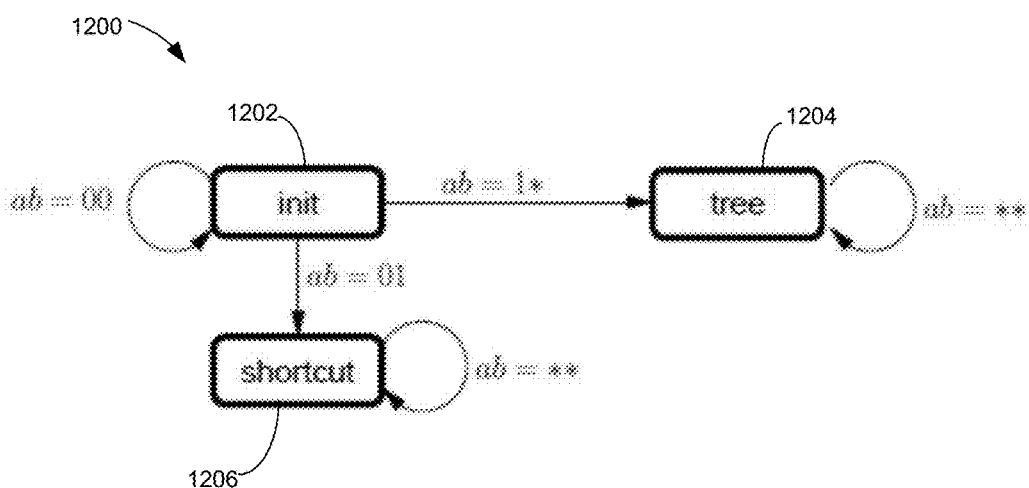
FIG. 12 illustrates a finite state machine (FSM) to select between tree edges and shortcut edges, in an example embodiment.

FIG. 12 illustrates a finite state machine (FSM) 1200 to select between tree edges 906 and shortcut edges 900, in an example embodiment. In various examples, the FSM may identify, for a pair of adjacent configuration state memory units 106 in C, which path to use, one with tree edges 906 or the one with shortcut edges 900. Information may propagate through both paths and select the shorter one. Let $i_1$, $i_2$ be a pair of adjacent configuration state memory units 106 of C. As disclosed herein, both $i_1$ send information up the tree until the information meets at the lowest common ancestor of both $i_1$ and $i_2$. The information from $i_1$ may then reach $i_2$ and vice versa. Additionally, $i_1$ may also send information along shortcut edges. In an example, the control plane of each internal node has one or more flip-flops to shift information up and down the tree. Similarly, each switch 900 has one or more flip-flops to shift information along the shortcut edges.

In an example, the lowest common ancestor of $i_1$ is x at level 1. The tree path between $i_1$ has length 2l and the shortcut path has length $|i_2-i_1|$. Leaf $i_1$ sends a binary "1" to its parent and the "1" shifts along the path through the lowest common ancestor node x and then back down to $i_2$; the lowest common ancestor may be determined in the same way as turn nodes 402 disclosed herein. Similarly, leaf $i_l$ may send another "1" through neighboring leaf $i_1+1$ to $i_2$. Both "1's" traverse the path, one node 402 at a time, through a sequence of flip-flops until the "1's" reach $i_2$ after 2l and $|i_2-i_1|$, clocks cycles, respectively. In an example, node $i_2$ has the FSM 1200 that accepts inputs from the tree edge 906 via the parent input port 1000 and the shortcut edge 900 via the side input port 1004, denoted as inputs be a and b, respectively. The FSM 1200 starts at an initial state 1202 and selects one of two states, tree 1204 or shortcut 1206, depending on which "1" reaches the FSM 1200 first; if both "1's" reach at the same clock cycle, then the FSM 1200 can pick any one of the two states. It may, in various examples, also be possible to get a better sense of the (combinational) path delays due to tree edges 906 and shortcut edges 900 by allowing signals to flow directly through the path (with flip-flops) and then latching the first signal that arrives at $i_2$. In this example, the FSM 1200, which may be present at every configuration state memory unit 106 and/or switch 904, has constant size and delay and does not change the network complexity.

In an example, the clock generation network described herein can be modified as follows to suit the tree 902 with shortcut edges 900. First, selected tree paths are processed as described herein (e.g., merged and pipelined out through the root of the tree). Next, the shortcut paths are processed in a similar way. All configuration state memory units 106 in a shortcut path are flagged with a 1 (initialization); configuration state memory units 106 that are not on a shortcut path are initialized to 0. Since the shorter among tree and shortcut paths have been selected, in this example, a shortcut path cannot be longer than 2 log n; thus, 2 log n time may suffice. The bit in each path (e.g., from its beginning of the path) is shifted up the tree 902 with paths merged as described herein. After 2 log n steps all bits of shortcut paths may have departed from the configuration state memory units 106. After an additional log n steps, the sequence of at most 2 log n bits representing the longest shortcut path has been output through the root of the tree. This can be encoded as described herein. The maximum of the lengths of the tree and shortcut paths can determine the clock speed. Such a determination can be weighted by the combinational switch delays on the paths. A separate global FSM sequences the $\Theta(\log n)$ steps utilized for clock generation.

In an example, a scan-path network includes shortcut edges 900 that is of size $\Theta(n)$ and which can configure a set of k configuration state memory units 106 out of a set of n configuration state memory units 106 in $\Theta(\log n \log \log \log n + kT_0)$ time, where $T_0$ is the minimum clock cycle needed for the scan-path network. For any contiguous distribution of the k configuration state memory units 106 of the configuration set S, this network uses a constant value of $T_0$. In various examples, even if the configuration state memory units 106 are not adjacent but relatively close to one another, the above $\Theta(\log n \log \log \log n + kT_0)$ time may nevertheless hold.

The value of $T_0$ may be upper bounded by a gap (in S) between contiguous configuration state memory units 106 of C. k may, in various examples, be expected to be larger than $\log n \log \log \log n$. Consequently, the time given is of the order of $kT_0$, which may be an ideal or optimized number of cycles to input the bitstream on the proposed network.

Thus, several $\Theta(n)$ cost networks have been disclosed that can efficiently scan a configuration bitstream into a set of k (out of n) configuration state memory units 106. Certain examples use a largely combinational circuit to scan the bits in $\Theta(k \log n)$ time. With added complexity per node 402, while still maintaining the overall $\Theta(n)$ cost, certain networks can progressively reduce the clock cycle $T_0$ (i.e., increase clock speed). Such networks scan the k-bit configuration bitstream 112 in $\Theta(\log n \log \log \log n + kT_0)$ time, where $T_0$ can be as small as a constant and at most $O(\log n)$.

In certain examples, the log log log n terms may be treated as constants. The topology used (tree with configuration state memory units 106 in the periphery) also has a $\Theta(n \log n)$ area layout. These resources may be relatively small compared to the overall resources used in an FPGA. The proposed ideas could, in various instances, also be used as a scan chain in design for testability.

Although in some instances described herein it has implicitly been assumed that the number of leaves in the tree to be a power of 2, embodiments extend with simple modifications to other balanced trees. Moreover, the tree does not have to be binary. For example, one can generalize to a q-ary tree for q>2. This reduces the height of the tree and the reconfiguration time. However, each internal node 402 now has to resolve paths between the parents and q children. Thus, a proper selection of q could provide trade-offs between the cost and the speed of the network.

Figure 13:
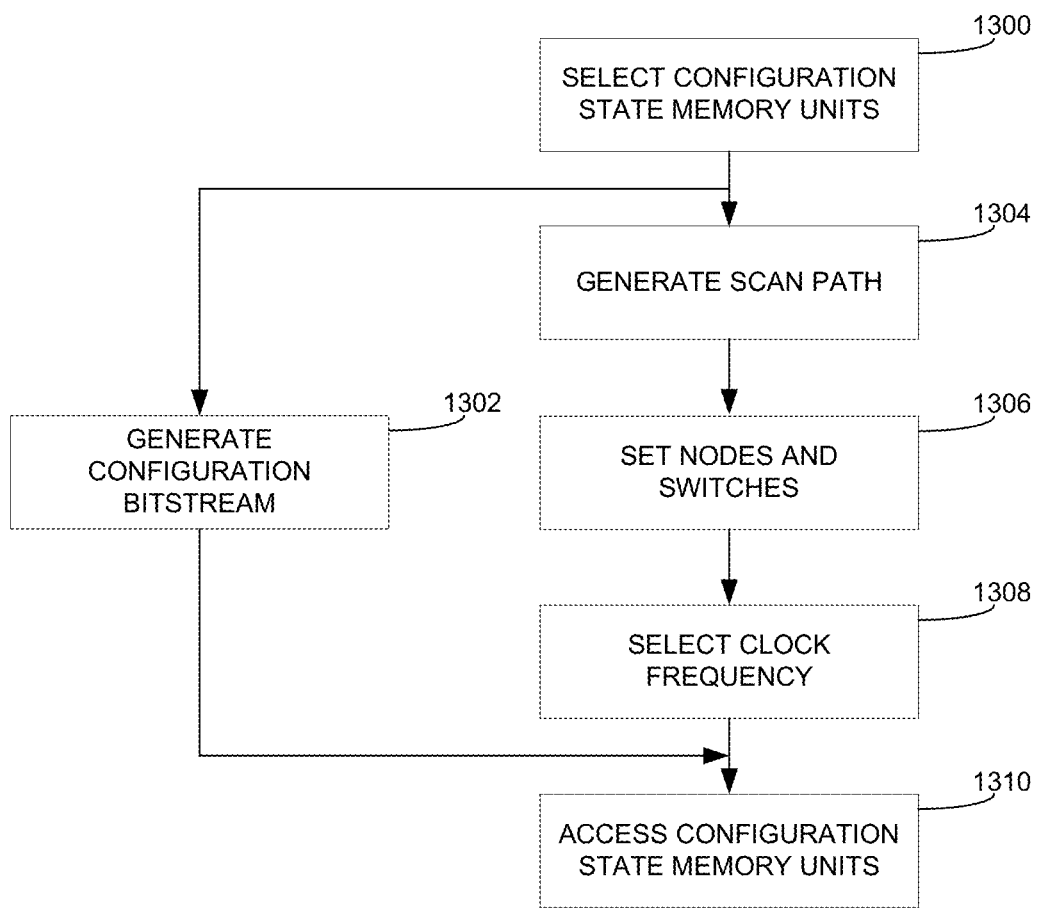
FIG. 13 is a flowchart for configuring a reconfigurable IC, in an example embodiment.

FIG. 13 is a flowchart for configuring a reconfigurable IC, in an example embodiment. The flowchart may be implemented with and according to the systems and processes disclosed herein, or with or according to any suitable system or process.

At 1300, the configuration controller selects configuration state memory units to reconfigure.

At 1302, a configuration bitstream including configuration bits is generated by the configuration controller to dynamically define the configuration of a reconfigurable integrated circuit by setting a state of a subset of configuration state memory units. The generation of the configuration bitstream may occur in parallel with some or all of operations 1304, 1306, and 1308.

In an example, a first configuration state memory unit of the subset of configuration state memory units is topologically proximate to a second configuration state memory unit of the subset of configuration state memory units, wherein the first and second configuration state memory units are communicatively coupled to one another via a direct physical connection between the first and second configuration state memory units, and wherein the scan path is based, at least in part, on the direct physical connection. In an example, the configuration state memory units are arranged in a hierarchical structure and wherein the scan path is based, at least in part, on a shortest path between ones of the subset of configuration state memory units based on the hierarchical structure and direct physical connections between individual configuration state memory units. In an example, the configuration state memory units are arranged in a hierarchical structure and wherein the scan path is based, at least in part, on a shortest path between ones of the subset of configuration state memory units based on the hierarchical structure and direct physical connections between individual configuration state memory units.

At 1304, the configuration controller generates a scan path.

At 1306, the configuration controller sets at least some nodes and switches to direct the scan path to the subset of configuration state memory units.

At 1308, the configuration controller selects one of the selectable clock frequencies based, at least in part, on an optimized frequency to input the configuration bits.

At 1310, individual configuration state memory units of the subset are accessed by the configuration controller according to the scan path through the configuration state memory units traversed according to a delay factor based, at least in part, on clock frequency of a clock signal produced by a configuration clock and configure the individual configuration state memory units with corresponding configuration bits of the configuration bitstream.

As used herein, the term "memory" refers to a machine-readable medium able to store data temporarily or permanently and may be taken to include, but not be limited to, random-access memory (RAM), read-only memory (ROM), buffer memory, flash memory, ferroelectric RAM (FRAM), and cache memory. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system, comprising:
a reconfigurable integrated circuit;
configuration state memory units that define a configuration of the reconfigurable integrated circuit;
a configuration clock, operatively coupled to the reconfigurable integrated circuit, producing a clock signal at a clock frequency; and
a configuration controller, operatively coupled to the configuration state memory units and the configuration clock, configured to dynamically define the configuration of the reconfigurable integrated circuit by setting bits of a subset of the configuration state memory units according to configuration bits of a configuration bitstream,
wherein the configuration controller is configured to access individual configuration state memory units of the subset according to a scan path through the configuration state memory units,
wherein the scan path directs traversal of the subset of the configuration state memory units according to a delay factor based on the clock frequency, and
wherein the configuration controller configures individual configuration state memory units in the subset of the configuration state memory units with corresponding configuration bits of the configuration bitstream.

2. The system of claim 1, wherein a first configuration state memory unit of the subset of the configuration state memory units is physically adjacent to a second configuration state memory unit of the subset of the configuration state memory units, wherein the first and second configuration state memory units are communicatively coupled to one another via a direct physical connection between the first and second configuration state memory units, and wherein the scan path is further based on the direct physical connection.

3. The system of claim 2, wherein the configuration state memory units are arranged in a hierarchical structure and wherein the scan path is further based, at least in part, on a shortest path between ones of the subset of the configuration state memory units based on the hierarchical structure and direct physical connections between individual configuration state memory units.

4. The system of claim 3, wherein the hierarchical structure further comprises nodes configurable to direct the scan path to the configuration state memory units of the subset.

5. The system of claim 1, wherein the scan path has a fast path and at least one slower path to respective elements of the configuration state memory units.

6. The system of claim 1, wherein the configuration clock has selectable clock frequencies; and
wherein the configuration controller is configured to select one of the selectable clock frequencies based, at least in part, on an optimized frequency to input the configuration bits.

7. The system of claim 1, wherein the reconfigurable integrated circuit is a field programmable gate array.

8. A method, comprising:
generating, with a configuration controller, a configuration bitstream including configuration bits to dynamically define a configuration of a reconfigurable integrated circuit by setting bits of a subset of configuration state memory units in a plurality of configuration state memory units; and
accessing, with the configuration controller, individual configuration state memory units of the subset according to a scan path through the subset of configuration state memory units,
wherein the scan path directs traversal of the subset of the configuration state memory units according to a delay factor based on a clock frequency, and
wherein the configuration controller configures the individual configuration state memory units with corresponding configuration bits of the configuration bitstream.

9. The method of claim 8, wherein a first configuration state memory unit of the subset of configuration state memory units is topologically proximate to a second configuration state memory unit of the subset of configuration state memory units, wherein the first and second configuration state memory units are communicatively coupled to one another via a direct physical connection between the first and second configuration state memory units, and wherein the scan path is further based on the direct physical connection.

10. The method of claim 9, wherein the plurality of configuration state memory units are arranged in a hierarchical structure and wherein the scan path is further based on a shortest path between ones of the subset of configuration state memory units based on the hierarchical structure and direct physical connections between individual configuration state memory units.

11. The method of claim 10, wherein the hierarchical structure further comprises nodes configurable to direct the scan path to the configuration state memory units of the subset and further comprising:
setting, with the configuration controller, at least some of the nodes to direct the scan path to the subset of configuration state memory units.

12. The method of claim 8, wherein the scan path has a fast path and at least one slower path to respective elements of the configuration state memory units.

13. The method of claim 8, wherein a configuration clock producing the clock frequency has selectable clock frequencies and further comprising:
selecting, with the configuration controller, one of the selectable clock frequencies based, at least in part, on an optimized frequency to input the configuration bits.

14. The method of claim 8, wherein the reconfigurable integrated circuit is a field programmable gate array.

15. A non-transitory computer readable medium, comprising instructions which, when implemented by a configuration controller, cause the configuration controller to perform operations comprising:
generate a configuration bitstream including configuration bits to dynamically define a configuration of a reconfigurable integrated circuit by setting bits of a subset of configuration state memory units within a plurality of configuration state memory units; and
access individual configuration state memory units of the subset according to a scan path through the subset of configuration state memory units,
wherein the scan path directs traversal of the subset of configuration state memory units according to a delay factor based on a clock frequency, and
wherein upon accessing individual configuration state memory units within the subset of configuration state memory units, the configuration controller configures the individual configuration state memory units with corresponding configuration bits of the configuration bitstream.

16. The non-transitory computer readable medium of claim 15, wherein a first configuration state memory unit of the subset of configuration state memory units is topologically proximate to a second configuration state memory unit of the subset of configuration state memory units, wherein the first and second configuration state memory units are communicatively coupled to one another via a direct physical connection between the first and second configuration state memory units, and wherein the scan path is further based on the direct physical connection.

17. The non-transitory computer readable medium of claim 16, wherein the plurality of configuration state memory units are arranged in a hierarchical structure and wherein the scan path is further based on a shortest path between ones of the subset of configuration state memory units based on the hierarchical structure and direct physical connections between individual configuration state memory units.

18. The non-transitory computer readable medium of claim 17, wherein the hierarchical structure further comprises nodes configurable to direct the scan path to the subset of configuration state memory units, and further comprising instructions which cause the configuration controller to:
set at least some of the nodes to direct the scan path to the subset of configuration state memory units.

19. The non-transitory computer readable medium of claim 15, wherein the scan path has a fast path and at least one slower path to respective elements of the subset of configuration state memory units.

20. The non-transitory computer readable medium of claim 15, wherein a configuration clock producing the clock frequency has selectable clock frequencies; and further comprising instructions which cause the configuration controller to:
select, with the configuration controller, one of the selectable clock frequencies based, at least in part, on an optimized frequency to input the configuration bits.

* * * * *